United States Patent
Tong et al.

(10) Patent No.: US 9,450,875 B1
(45) Date of Patent: Sep. 20, 2016

(54) COOPERATIVE FAULT TOLERANCE AND LOAD BALANCING

(75) Inventors: Darick Tong, San Francisco, CA (US); Ryan D. Anderson, San Francisco, CA (US)

(73) Assignee: Google Inc., Mountain View, CA (US)

(*) Notice: Subject to any disclaimer, the term of this patent is extended or adjusted under 35 U.S.C. 154(b) by 883 days.

(21) Appl. No.: 13/604,574

(22) Filed: Sep. 5, 2012

Related U.S. Application Data

(60) Provisional application No. 61/538,704, filed on Sep. 23, 2011.

(51) Int. Cl.
*H04L 12/803* (2013.01)

(52) U.S. Cl.
CPC .................... *H04L 47/125* (2013.01)

(58) Field of Classification Search
CPC . H04L 47/125; H04L 67/10; H04L 67/1008; H04L 63/0892; H04L 67/1029; H04L 67/1025; H04L 67/101; H04L 67/1034; H04L 67/1036; H04L 29/06; H04L 67/1002; H04L 2029/06054
See application file for complete search history.

(56) References Cited

U.S. PATENT DOCUMENTS

| | | | |
|---|---|---|---|
| 6,324,580 B1 | 11/2001 | Jindal et al. | |
| 6,327,622 B1 | 12/2001 | Jindal et al. | |
| 7,421,695 B2 * | 9/2008 | Murray | H04L 29/06 709/223 |
| 2005/0015492 A1 * | 1/2005 | Kumbalimutt | H04L 67/1006 709/226 |
| 2006/0212453 A1 * | 9/2006 | Eshel | G06F 11/2025 |
| 2006/0221815 A1 * | 10/2006 | Matsumoto | H04L 12/2602 370/216 |
| 2007/0192326 A1 * | 8/2007 | Angal | G06F 11/1482 |
| 2008/0313274 A1 * | 12/2008 | Murray | H04L 29/06 709/203 |
| 2011/0131645 A1 * | 6/2011 | Johnson | G06F 11/0709 726/12 |
| 2013/0054822 A1 * | 2/2013 | Mordani | H04L 67/1034 709/228 |

* cited by examiner

*Primary Examiner* — Philip Chea
*Assistant Examiner* — Wuji Chen
(74) *Attorney, Agent, or Firm* — Fish & Richardson P.C.

(57) ABSTRACT

Methods, systems, and apparatus, including computer programs encoded on a computer storage medium, for cooperative fault tolerance and load balancing. In one aspect, a method includes receiving a request from an entity wherein the request includes metadata specifying a plurality of non-responsive servers to which the entity sent the request but that could not process the request; determining that the data processing apparatus is not a current home server for the entity based on information cached in the data processing apparatus, wherein the current home server is a server within a plurality of preferred servers that processes requests for the entity and, in response thereto: assigning the data processing apparatus as the current home server so that the entity will send subsequent requests to the data processing apparatus for processing; and sending a response to the entity.

27 Claims, 6 Drawing Sheets

COOPERATIVE FAULT TOLERANCE AND LOAD BALANCING

RELATED APPLICATIONS

This application claims under 35 U.S.C. §119(e) the benefit of U.S. Provisional Application No. 61/538,704, filed Sep. 23, 2011, which is hereby incorporated by reference in its entirety.

BACKGROUND

This specification relates to fault tolerance and load balancing.

Fault tolerance is the quality that allows a system to continue operating in the event of a failure of one or more system components. Fault tolerance is important in high-availability or life-critical systems. Fault tolerant systems can be used for both planned and unplanned service outages. Some fault tolerant systems require no single point of failure and have the ability to identify the failing component.

Load balancing is the quality of distributing load evenly across multiple computers, disk drives, or other system components to achieve the efficient processing potential and avoid overload. Some load balancers are software programs that process incoming requests and determine which server will most optimally process the request. The load balancer then routes the request to the optimal server. For example, load balancers may be used for front end web services or back end database services.

SUMMARY

In general, one aspect of the subject matter described in this specification can be embodied in methods that include the actions of receiving a request from an entity wherein the request includes metadata specifying a plurality of non-responsive servers to which the entity sent the request but that could not process the request; determining that the data processing apparatus is not a current home server for the entity based on information cached in the data processing apparatus, wherein the current home server is a server within a plurality of preferred servers that processes requests for the entity and, in response thereto: assigning the data processing apparatus as the current home server so that the entity will send subsequent requests to the data processing apparatus for processing; and sending a response to the entity. Other embodiments of this aspect include corresponding systems, apparatus, and computer programs, configured to perform the actions of the methods, encoded on computer storage devices.

These and other embodiments can each optionally include one or more of the following features. Processing the request to generate the response. Receiving a second request from a second entity wherein the second request includes metadata specifying that the second entity has not sent the second request to a current home server for the second entity, wherein the current home server for the second entity is a server within a plurality of preferred servers that processes requests for the second entity; determining that the data processing apparatus is not the current home server for the second entity based on information cached in the data processing apparatus and, in response thereto: sending a redirect response to the second entity which will cause the second entity to send the second request to a server specified in the redirect response. Receiving a second request from a second entity; determining that the data processing apparatus is not a current home server for the second entity based on information cached in the data processing apparatus, wherein the current home server for the second entity is a server within a plurality of preferred servers that processes requests for the second entity; determining that each of the preferred servers is one of the non-responsive servers; and sending a second response wherein the response is a fail response which will cause the second entity to send the second request to another server of the plurality of preferred servers.

These and other embodiments can each optionally include one or more of the following additional features. Preferred servers are selected from a plurality of servers using a hash algorithm, a consistent-hash algorithm, or a uniform hash function. Receiving a second request from a second entity; determining that the data processing apparatus is a current home server for the second entity based on information cached in the data processing apparatus, wherein the current home server for the second entity is a server within a plurality of preferred servers that processes requests for the second entity and, in response thereto; processing the second request to generate a second response; and sending the second response to the second entity. Selecting a server in the plurality of preferred servers that has lower resource usage than the data processing apparatus; and sending an offload request to the selected server which will cause the server to process the request.

These and other embodiments can each optionally include one or more of the following additional features. Receiving an offload request from a first server, wherein the offload request indicates that the data processing apparatus has lower resource usage than the first server; and assigning the data processing apparatus as the current home server of a second entity based on the offload request so that the second entity will send subsequent requests to the data processing apparatus for processing. For one or more entities in a plurality of previously serviced entities, sending a gravitation request to a respective preferred server that is assigned to the entity, wherein the gravitation request will cause the respective preferred server to assign itself as the current home server of the entity so that the entity will send subsequent requests to the respective preferred server.

Particular embodiments of the subject matter described in this specification can be implemented so as to realize one or more of the following advantages. The method and homing protocol achieves fault tolerance and load balancing across a set of stateful servers without requiring any additional server dependencies. By eliminating the need for additional server dependencies, the system runs without an additional point of failure. Another advantage is for systems that benefit from stickiness, which is the practice of routing requests for a given entity to a consistent server. Sticky systems whose servers become unavailable can automatically failover to other available servers while maintaining an even load across servers. Yet another advantage is that the latency of determining the most efficient processing server is reduced by using independent homing caches. Additionally, without a need for a separate service, individual servers may be serviced, upgraded, added, or removed while not interrupting any client processes and maintaining an even load across servers. In some implementations, client processes may be simplified because the servers handle the majority of the fault tolerance and load balancing.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

Figure 1:
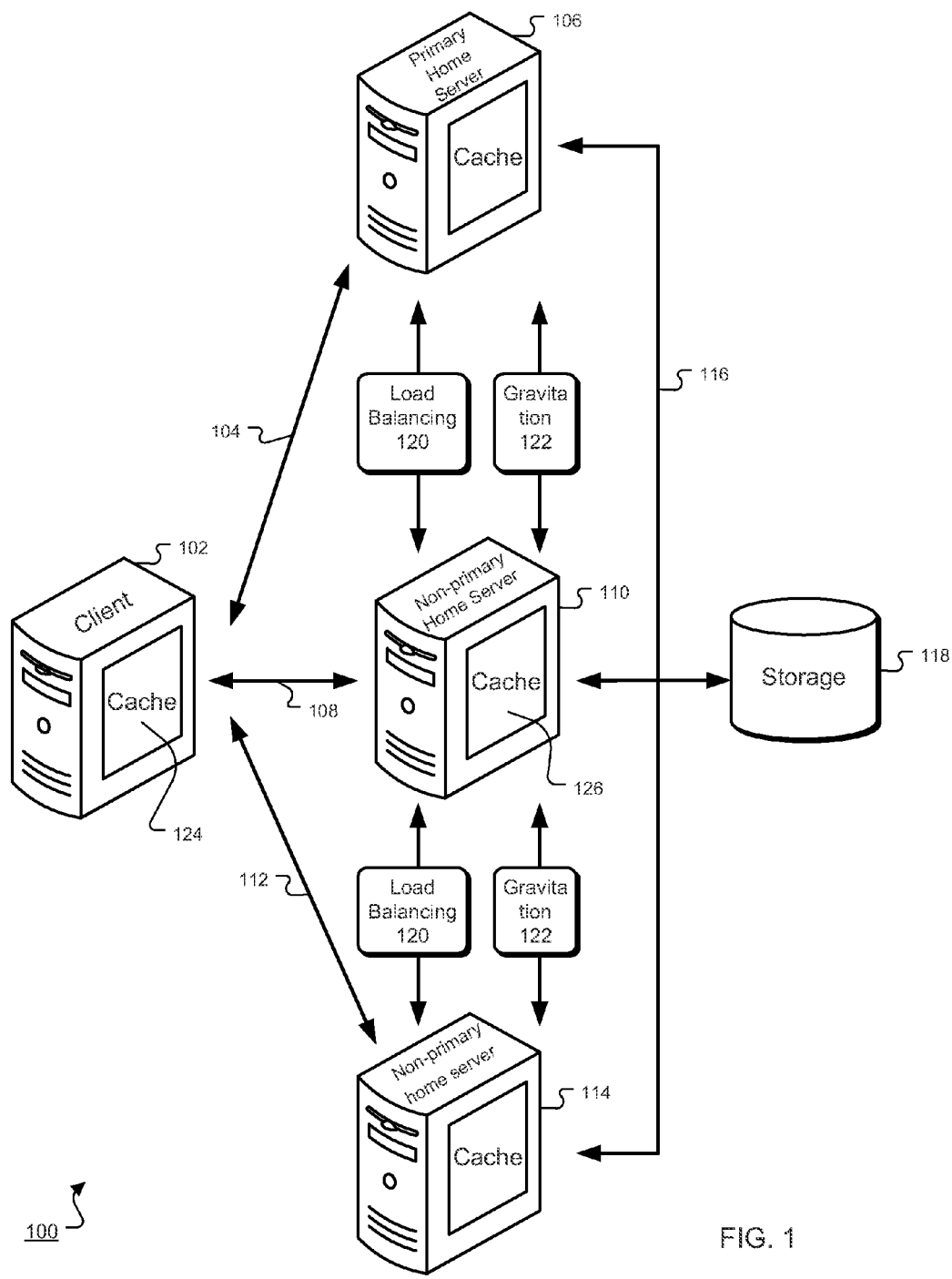
FIG. 1 is a schematic illustration of an example cooperative fault tolerance and load balancing system.

FIG. 1 is a schematic illustration of an example cooperative fault tolerance and load balancing system 100. The system 100 can include one or more clients and one or more servers. By way of illustration, the system 100 includes a client 102 and servers 106, 110, and 114. Generally speaking, clients and servers are data processing apparatus such as rack-mounted servers or other computing devices. The clients and servers can be in the same physical location (e.g., data center) or they can be in different physical locations. The clients and servers can have different capabilities and computer architectures. In some implementations, the client 102 can be an end-user device such as a personal computer, a laptop computer, a tablet computer, or a smart phone, for instance. In further implementations, clients (e.g., client 102) can operate as front-end servers that communicate with servers 106, 110, 114 that operate as back-end servers. In some implementations, servers can access a storage system 118. The storage system 118 is an electronic file system, a distributed file system or other network-accessible persistent storage which can store information on computer-readable storage media. The storage system 118 can comprise one or more data processing apparatus and one or more computer-readable media.

Each client and server in the system 100 maintains its own homing cache (e.g., homing cache 124 and homing cache 126). A homing cache includes a current home server for each entity associated with a client. A current home server is the current server that the client machine will send requests to on behalf of the entity. An entity is a uniquely identifiable object. By way of illustration, an entity can represent a session, a user, or a document. (Other kinds of entities are possible.) For example, a user entity may request a retrieval of their email, which will cause the client to send a request to the current home server for the user. In some implementations, an entity is a computer program that executes on a client and generates requests for the client to send.

Clients maintain an assignment list for each entity associated with the client. In some implementations, the assignment list is an ordered list of preferred servers. The assignment list can be generated using hash or consistent hash functions, for example. (Assignment functions are described further below.) An assignment list includes a primary home server (e.g., the server 106) and one or more non-primary home servers (e.g., servers 110 and 114). A primary home server is the most preferred server in the assignment list. The non-primary home servers are used if the primary home server is unavailable or non-responsive. Clients use the assignment list for a given entity to determine which server to send the entity's request to. For example, a client will send its first request 104 to the primary home server 106, which is the first server in the assignment list. If the request to the primary home 106 fails, the client will send the request 108 to the next server in the ordered list which is a non-primary home server (eg., the secondary home server 110). Because the homing caches 124 and 126 of both client and server machines can become out of sync, the system 100 can persist the current home server in storage 118.

The assignment functions that generate an assignment list can take into account multiple factors: 1) primary home of entities should be spread uniformly across servers, which approximates spreading load evenly across servers in a steady state; 2) for entities assigned to a given primary home, the entities' non-primary homes should be spread across remaining servers to avoid creating "hotspots" for non-primary homes when the primary home server is unavailable; 3) The length of the assignment list should be less than the number of servers. In some implementations, the length of the assignment list is proportional to the amount that servers are overprovisioned. If the assignment list is too long, server failures can cascade as re-homings result in overloading healthy servers.

In some implementations, the primary home for an entity is computed using a uniform hash function and taking the resulting value modulo the number of servers (n):

$$\text{Primary-home(entity)} = \text{hash(entity)} \% n$$

This is suitable for systems in which the number of servers is relatively static. In other implementations in which the number of servers may change often, a stable hashing algorithm such as a consistent-hash can be used to minimize the amount of reassignment when the number of servers (n) changes:

$$\text{Primary-home(entity)} = \text{consistent-hash(entity},n)$$

$$\text{Secondary-home(entity)} = (\text{hash(entity)} \%(n-1) + \text{primary-home(entity)} + 1)\% \ n$$

In other implementations in which servers are upgraded in a rolling fashion, a padding value (p) can be added to guarantee a certain distance between any entity's primary and secondary homes. As a result, at least one of the primary and secondary home servers 106 and 110 will be available even if adjacent servers are in the process of being upgraded:

$$\text{Secondary-home(entity)} = (\text{hash(entity)} \%(n-2p-1) + \text{primary-home(entity)} + p + 1)\% \ n$$

Figure 2:
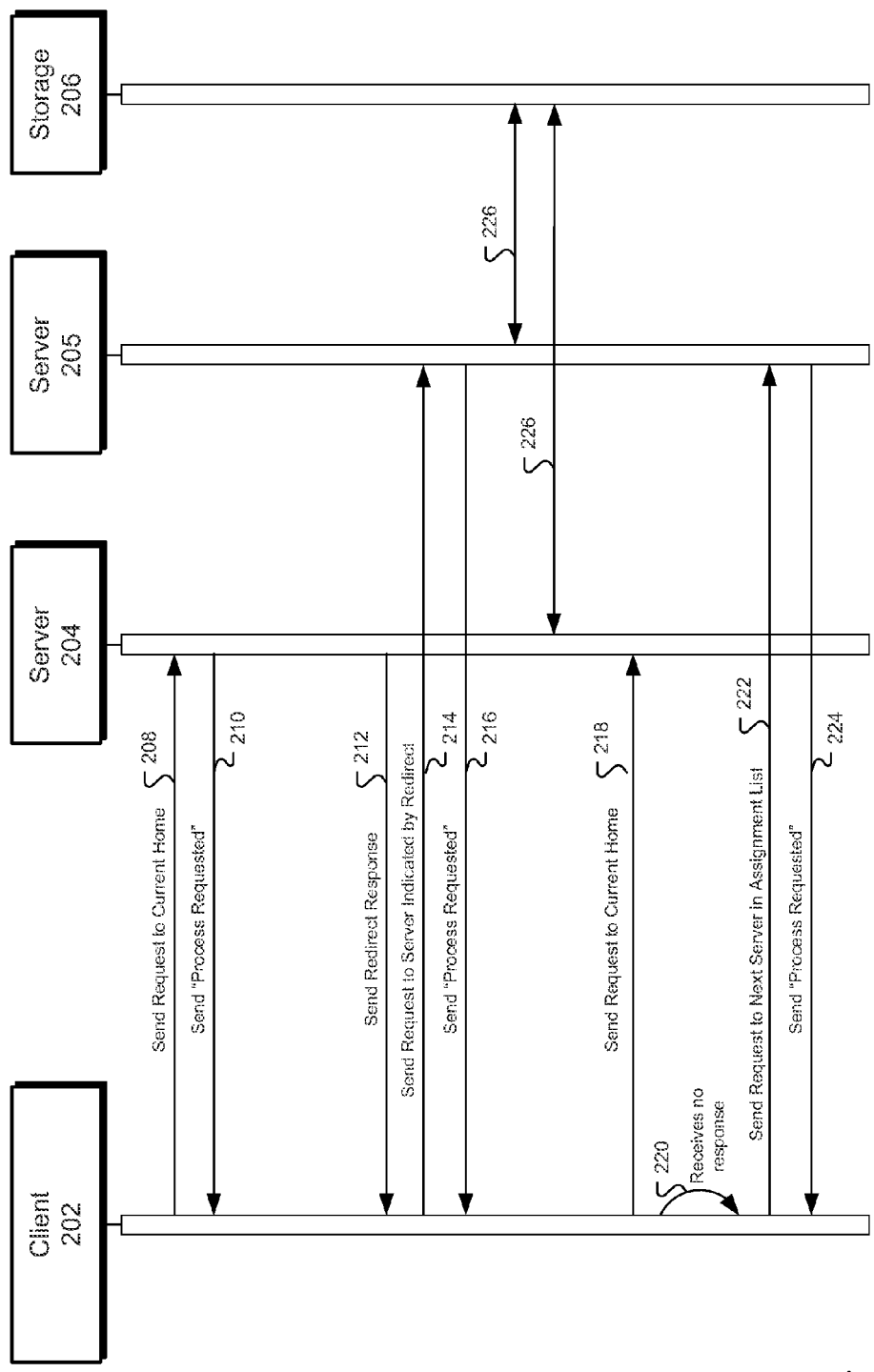
FIG. 2 is a diagram illustrating example communications using the homing protocol.
Figure 3:
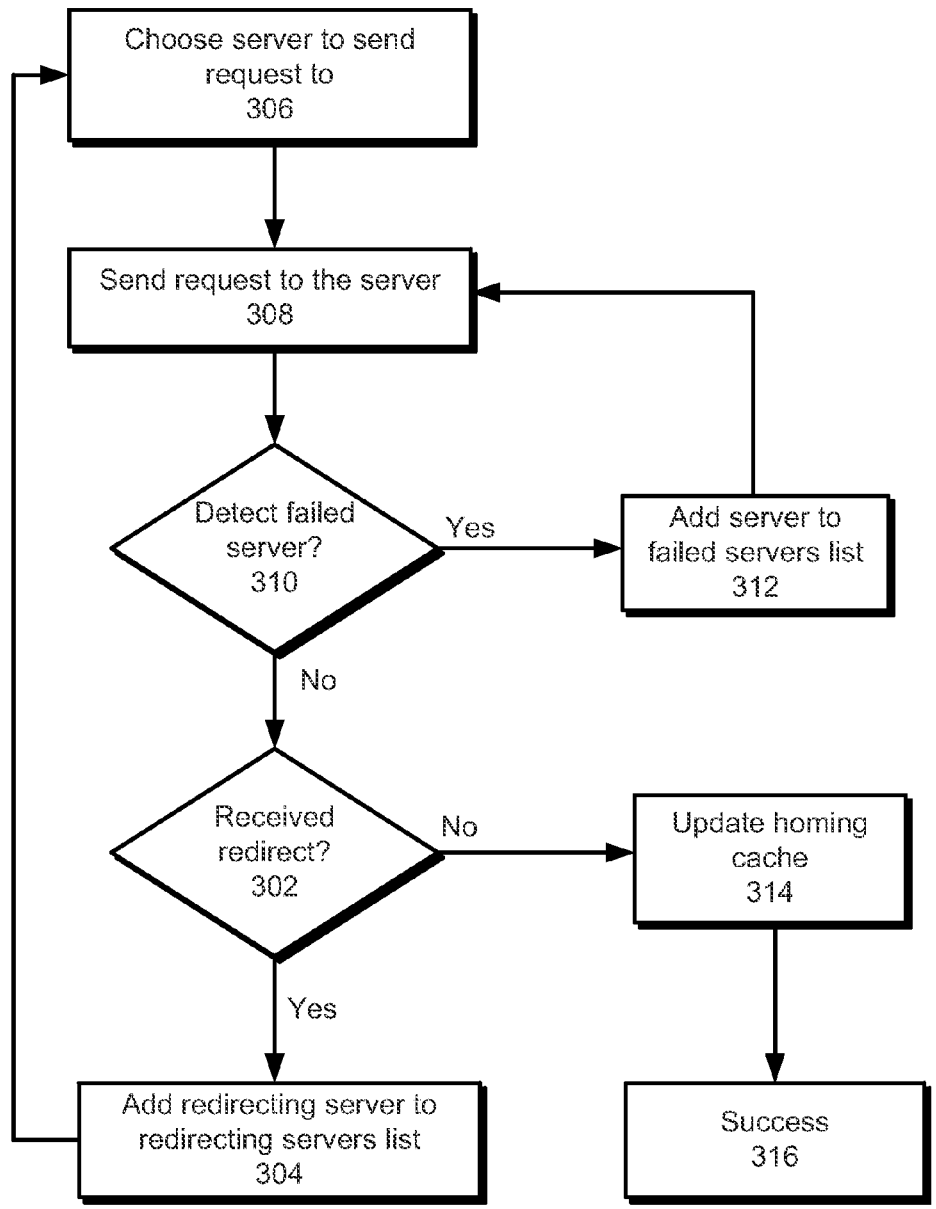
FIG. 3 is a flow diagram illustrating example behaviors of a client using the homing protocol.
Figure 4:
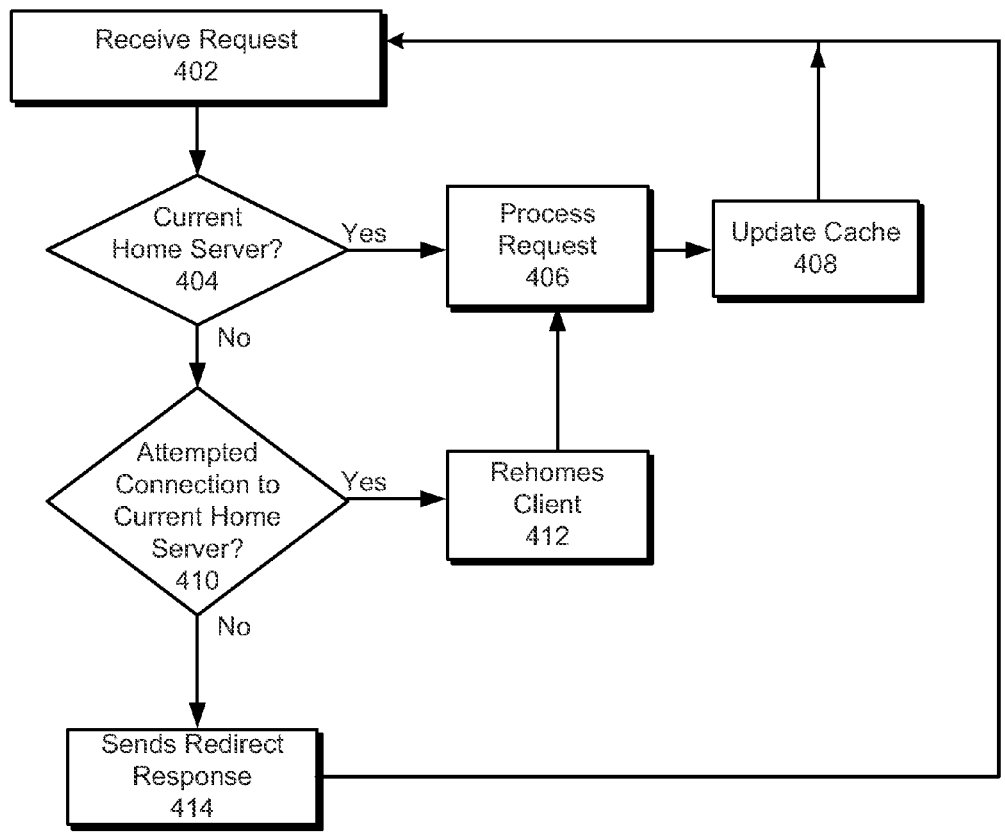
FIG. 4 is a flow diagram illustrating example behaviors of a server using the homing protocol.

Clients and servers communicate with each other using a homing protocol 104, 108, 112, and 116. The homing protocol ensures that no server will be a single point of failure. Furthermore, the homing protocol removes the necessity of running a separate service that manages entity assignment. FIGS. 2-4 describe the homing protocol in more detail. The homing protocol attaches metadata to requests and responses made by the client and server. The metadata is agnostic to the protocol used to send requests and responses. In some implementations, the metadata may be attached to any remote-procedure call protocol. In some implementations, the homing protocol supports the attachment of metadata to Hypertext Transfer Protocol (HTTP) requests and responses via headers. In other implementations, the homing protocol supports attachment of metadata to SOAP or other XML-based protocol via extra XML elements or attributes of the requests and responses. (Other ways of including metadata in a protocol are possible.)

FIG. 2 is a diagram that outlines examples of how the homing protocol may be used to communicate between a client 202, servers 204 and 205, and storage 206. By way of illustration, client 202 sends a request 208 on behalf of an entity to the client 202's current home server 404. An example request can be a user entity retrieving his or her email. The request 208 includes metadata for the entity which contains an identifier for the entity, a list of failed servers, and a list of redirecting servers. The list of failed servers keeps track of servers to which the client sent the request but failed to receive a response from. The list of re-directing servers keeps track of servers to which the client sent the request but received a redirect response from. These lists may be mutated as will be further described below. The server 204 successfully processes the request 208 and sends a response 210 which does not include metadata. For example, the response could contain an email message. In another scenario, the server 204 can determine that the server 204 is not the server to process the request 208 and thereafter send a redirect response 212 to the client 202. When the server 204 sends a redirect response 212, the redirect response metadata includes identification of a different server that the client 202 should send the request 208 to. The client 202 adds the server 204 to its list of redirecting servers and then sends the request 214 to the server 205 indicated by the redirect response 212 with attached metadata that includes the entity, the list of failed servers, and the list of redirecting servers, which was modified to include identification of the server 204. Upon successful processing of the request 214, the server 205 sends a response 216 to the client 202 without any metadata. In yet another scenario, the server 204 may be unavailable due to downtime or a network error. When a client 202 receives no response 220 from the unavailable current home server 204, the client 202 then sends the request 222 to the next server 205 in the assignment list for the entity with metadata that includes the entity, the list of failed servers, which is modified to include the non-responsive server 204 (see description further below), and the list of redirecting servers. In some implementations, the list of failed servers and re-directing servers may be combined into one list. In some implementations, both lists are initially empty.

FIG. 3 is a flow chart diagram of example actions a client takes according to the homing protocol. A client (e.g., the client 102) starts by creating a request on behalf of an entity. The client first looks in its homing cache (e.g., the homing cache 124) for the entity's current home server (e.g., the server 106; step 306). If no current home server exists in the homing cache, the client sends the request to the entity's primary home server, which is the first server in the entity's assignment list (step 308). Upon a successful request from the primary home, the client updates its homing cache to track where the entity is currently homed (step 314). If a current home server exists in the cache (step 306), the client sends the request with attached metadata to the current home server specified in the client's homing cache (step 308). If the client does not receive a response from the server after sending a request, the client adds the current home server into the list of failed servers (step 312), which is attached as metadata to the request. For example, a client may have attempted to send a request to the current home 218 but received no response 220 because the current home is unavailable due to a network error. The client then selects the next server in the entity's assignment list that has not yet been tried 222 and attempts to send the request there. Also, if the client receives a redirect response from a server (step 302), the client also adds the current home server into the list of re-directing servers, which is attached to the metadata of the request. The client then sends the request to the server specified in the metadata of the request (step 414). If all servers in the assignment list have been attempted, the request fails.

FIG. 4 is a flow chart diagram of example actions a server takes according to the homing protocol. Once a server (e.g. the server 106) receives a request, it checks its homing cache (e.g., the homing cache 126) to determine if the server is the entity's current home server (e.g., the server 106; step 404). If the receiving server (e.g., the server 204) is the current home as indicated in the cache, the server processes the request (step 406) and updates its homing cache (step 408). If no entry exists in the cache, the server assigns the entity's primary home as the current home, processes the request, and returns a successful response. If the entry exists, but the receiving server is not the current home, the server determines whether the client has already attempted to send a request to the current home by checking if the current home is in the list of failed servers or the list of re-directing servers (step 410). If the client has already attempted to send a request to the current home (step 410), the server "re-homes" the entity by setting the server as the entity's current home in its homing cache (step 412), processes the request (step 406), and returns a successful response 224. In the future, the client will send requests to the updated home server unless gravitation occurs, which will be described further below. If the client has not yet attempted to send a request to the current home (step 410), the server responds with a redirect response (step 414) and indicates the correct server that the client should send the request to.

In some implementations, servers may mutate persistent state. Entities may be required to send multiple requests such that one request depends on the results of a previous request. The entity therefore must adhere to a "stickiness" practice, which routes the sequence of multiple requests to be processed on the same server. In other words, the entity requires "stickiness." To ensure the requests will be processed on the same server, the homing protocol can be augmented to include an authoritative bit and an authoritative home server in the metadata of a request. The authoritative bit indicates whether a redirect is authoritative. The authoritative home server is the server assigned to process the request regardless of what is specified in the server's homing cache. Before processing a request for an entity, the server (e.g., the server 204) reads two values from storage (e.g., storage system 118): the entity's authoritative home and its storage version. The storage version indicates the most recent authoritative home. In some implementations, the storage version can be any increasing number, such as a nanosecond timestamp. In other implementations, these values can be maintained in a storage cache to reduce storage activity in subsequent requests. If the server is not the entity's authoritative home based on information in storage 118, the server returns an authoritative redirect to the client. Otherwise, the server continues processing the request. Similar to the re-homing process above, if the server detects the client has already attempted connecting to the authoritative home, the server will attempt to re-home. Otherwise, the server will send an authoritative redirect to the client. Re-homing in this context involves writing to storage 226 to change the value of the authoritative home from the unresponsive server to the re-homing server. In some implementations, storage writes 226 include writing the current authoritative home and storage version. Other implementations include storage writes 226 using a test-and-set primitive to ensure atomicity. Upon receiving an authoritative redirect, clients send a request with the authoritative bit set to indicate that the redirect was authoritative. Because the authoritative bit is set, the receiving server processes the request even if it is not the current home server according to its homing cache. In some implementations, servers delay the commit of an authoritative home storage write 226 until the next client-initiated storage write. Using storage 118 as the authority on which server is an entity's current home enables the system to achieve "stickiness" without introducing a dependence on a separate service.

Figure 5:
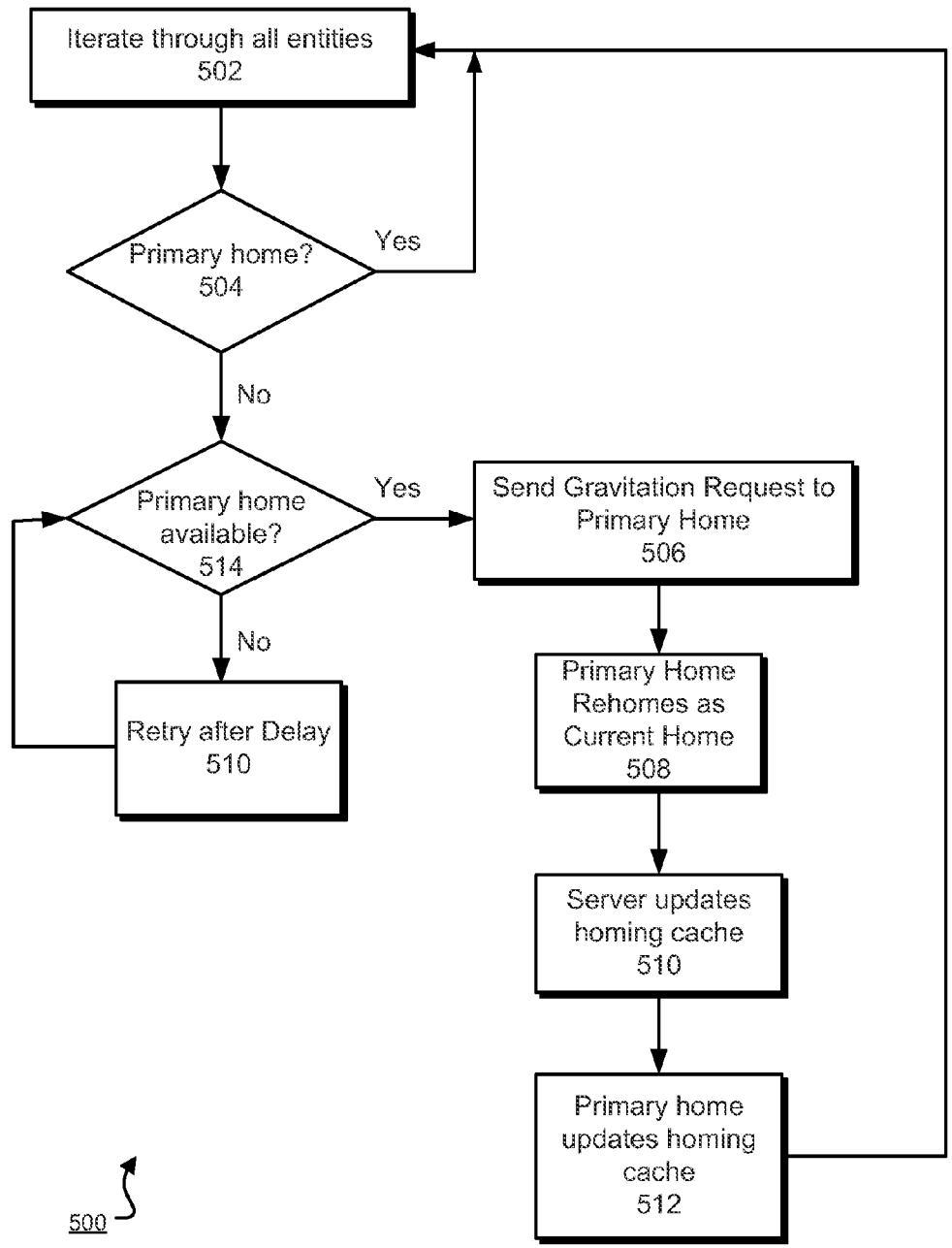
FIG. 5 is a flow diagram illustrating an example technique for gravitation.

FIG. 5 demonstrates an example of gravitation 122. The homing protocol achieves fault tolerance by retrying requests when a server is unavailable. As a result, the entities originally assigned to the unavailable server are redistributed across the remaining servers. Over time, the system 100 may experience uneven load across all servers. Gravitation is the process of gradually returning entities to their primary homes, which creates a more even load across the servers. This is implemented via server to server communication. In some implementations, gravitation 122 is a background process that runs during normal client-server interaction. Each server (e.g., the servers 106, 110, 114) inspects its homing cache and periodically iterates over all entities for which it is the current home, but not the primary home (step 502). After a period of time has passed since the entity was re-homed (step 510), the server sends a gravitation request to the entity's primary home (step 506). The gravitation request causes the server to reassign itself as the entity's primary home server 106. If the primary home server 106 receives the request, it processes the gravitation request by re-homing the entity (step 508). Both the primary home server and the previous server update their homing caches (steps 510 and 512) to correctly reflect the current home server. If the primary home server is unavailable, the server retries after a delay (step 510). For example, the primary home server may be unavailable because the condition which caused the entity to be re-homed is still in effect. In some implementations, the delays also increase exponentially up to a maximum to avoid inundating the servers.

Figure 6:
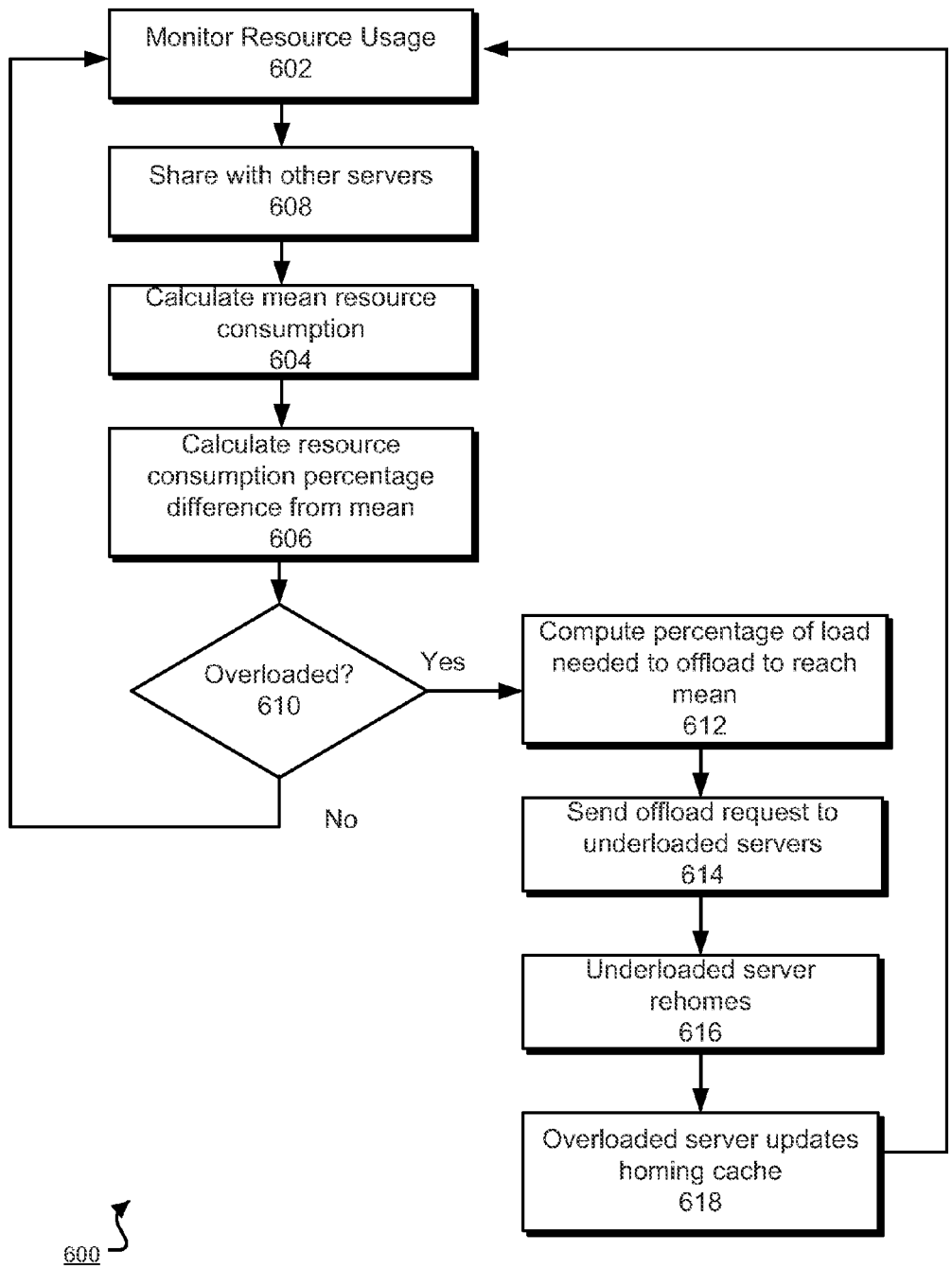
FIG. 6 is a flow diagram illustrating an example technique for cooperative load balancing.

FIG. 6 is a flow chart diagram demonstrating an example of cooperative load balancing 120. Cooperative load balancing is a process that allows overloaded servers to offload entities to non-primary homes that are under-loaded via server to server communication. In some implementations, cooperative load balancing 120 is a background process that runs during normal client-server interaction. Each server (e.g., the servers 106, 110, and 114) monitors its own resource usage (step 602) and periodically shares this information with all other servers (step 608). In some implementations, load balancing and gravitation use the same inter-server communication channels. Each server computes metrics that determine its load its comparison to other servers. For example, metrics can include a mean resource consumption (step 604) and a resource consumption percentage difference from the mean (step 606). An overloaded server is a server that is consuming resources above the mean. Overloaded servers compute the percentage of its load that it would need to offload to reach the mean (step 612). Overloaded servers then partition this percentage across non-primary home servers that are consuming resources below the mean proportional to the amounts that they are under-loaded. Overloaded servers then send offload requests to those non-primary home servers (step 614). The offload request includes the entities that the overloaded server wishes to offload. When a non-primary server receives the offload request, the non-primary home server re-homes the entity and both servers update their homing caches (step 616). Upon successful re-homing, the overloaded server updates its homing cache so future requests will be processed by the non-primary home server (step 618). In some implementations, a server only gravitates an entity back to its primary home if the primary home is less loaded than the current server.

In some implementations, the homing protocol is modified such that a server (e.g., the server 110) forwards a request to the current home and proxies the resulting response back to the client instead of sending a redirect to the client. When forwarding a request, a server adds itself to a list of forwarding hops which is included in the metadata of the request. If the length of the list exceeds a number of hops, the request fails. If the server forwards the request to the current home server and the current home server processes the request, both servers update their homing caches to correctly reflect the current home server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a server, the method comprising:
    receiving, at the server, a request from an entity wherein the request includes metadata specifying a plurality of non-responsive servers to which the entity sent the request but that could not process the request;
    determining, at the server, that the server is not a current home server for the entity based on information cached in the server, the information indicating that the current home server of the entity is one of the non-responsive servers to which the entity sent the request, wherein the current home server is a server within a plurality of preferred servers that processes requests for the entity and, in response thereto:
        assigning, by the server, the server as the current home server by updating the information cached in the server so that the entity will send subsequent requests to the server for processing; and
        sending a response to the entity.

2. The method of claim 1, further comprising processing the request to generate the response.

3. The method of claim 1, further comprising:
    receiving, by the server, a second request from a second entity wherein the second request includes metadata specifying that the second entity has not sent the second request to a current home server for the second entity, wherein the current home server for the second entity is a server within a plurality of preferred servers that processes requests for the second entity;
    determining, by the server, that the sever is not the current home server for the second entity based on information cached in the server and, in response thereto:
        sending, from the server, a redirect response to the second entity which will cause the second entity to send the second request to a server specified in the redirect response.

4. The method of claim 1, further comprising:
    receiving, by the server, a second request from a second entity;
    determining, by the server, that the server is not a current home server for the second entity based on information cached in the server, wherein the current home server for the second entity is a server within a plurality of preferred servers that processes requests for the second entity;
    determining, by the server, that each of the preferred servers is one of the non-responsive servers; and
    sending, by the server, a second response wherein the response is a fail response which will cause the second entity to send the second request to another server of the plurality of preferred servers.

5. The method of claim 1 wherein preferred servers are selected from a plurality of servers using a hash algorithm, a consistent-hash algorithm, or a uniform hash function.

6. The method of claim 1, further comprising:
    receiving, by the server, a second request from a second entity;
    determining, by the server, that the server is a current home server for the second entity based on information cached in the server, wherein the current home server for the second entity is a server within a plurality of preferred servers that processes requests for the second entity and, in response thereto;
        processing, by the server, the second request to generate a second response; and
        sending, by the server, the second response to the second entity.

7. The method of claim 1, further comprising:
    selecting a second server in the plurality of preferred servers that has lower resource usage than the server; and
    sending an offload request to the selected second server which will cause the second server to process the request.

8. The method of claim 1, further comprising:
    receiving, at the server, an offload request from a first server, wherein the offload request indicates that the server has lower resource usage than the first server; and
    assigning, by the server, the server as the current home server of a second entity based on the offload request so that the second entity will send subsequent requests to the server for processing.

9. The method of claim 1, further comprising:
    for one or more entities in a plurality of previously serviced entities, sending a gravitation request to a respective preferred server that is assigned to the entity, wherein the gravitation request will cause the respective preferred server to assign itself as the current home server of the entity so that the entity will send subsequent requests to the respective preferred server.

10. A server comprising:
    a hardware processor; and
    a non-transitory computer-readable medium coupled to the processor and having instructions stored thereon, which, when executed by the processor, cause the processor to perform operations comprising:
        receiving, by the server, a request from an entity wherein the request includes metadata specifying a plurality of non-responsive servers to which the entity sent the request but that could not process the request;
        determining, by the sever, that the server is not a current home server for the entity based on information cached in the server, the information indicating that the current home server of the entity is one of the non-responsive servers to which the entity sent the request, wherein the current home server is a server within a plurality of preferred servers that processes requests for the entity and, in response thereto:
            assigning, by the server, the server as the current home server by updating the information cached in the server so that the entity will send subsequent requests to the server for processing; and
            sending, by the server, a response to the entity.

11. The system of claim 10, further comprising processing the request to generate the response.

12. The system of claim 10, further comprising:
receiving, by the sever, a second request from a second entity wherein the second request includes metadata specifying that the second entity has not sent the second request to a current home server for the second entity, wherein the current home server for the second entity is a server within a plurality of preferred servers that processes requests for the second entity;
determining, by the server, that the server is not the current home server for the second entity based on information cached in the server and, in response thereto:
sending, by the server, a redirect response to the second entity which will cause the second entity to send the second request to a server specified in the redirect response.

13. The system of claim 10, further comprising:
receiving, by the sever, a second request from a second entity;
determining, by the sever, that the server is not a current home server for the second entity based on information cached in the server, wherein the current home server for the second entity is a server within a plurality of preferred servers that processes requests for the second entity;
determining, by the sever, that each of the preferred servers is one of the non-responsive servers; and
sending, by the sever, a second response wherein the response is a fail response which will cause the second entity to send the second request to another server of the plurality of preferred servers.

14. The system of claim 10 wherein preferred servers are selected from a plurality of servers using a hash algorithm, a consistent-hash algorithm, or a uniform hash function.

15. The system of claim 10, further comprising:
receiving, by the sever, a second request from a second entity;
determining, by the sever, that the server is a current home server for the second entity based on information cached in the server, wherein the current home server for the second entity is a server within a plurality of preferred servers that processes requests for the second entity and, in response thereto;
processing, by the sever, the second request to generate a second response; and
sending, by the sever, the second response to the second entity.

16. The system of claim 10, further comprising:
selecting a first server in the plurality of preferred servers that has lower resource usage than the server; and
sending, by the sever, an offload request to the selected first server which will cause the server to process the request.

17. The system of claim 10, further comprising:
receiving, by the sever, an offload request from a first server, wherein the offload request indicates that the server has lower resource usage than the first server; and
assigning, by the sever, the server as the current home server of a second entity based on the offload request so that the second entity will send subsequent requests to the server for processing.

18. The system of claim 10, further comprising:
for one or more entities in a plurality of previously serviced entities, sending a gravitation request to a respective preferred server that is assigned to the entity, wherein the gravitation request will cause the respective preferred server to assign itself as the current home server of the entity so that the entity will send subsequent requests to the respective preferred server.

19. A non-transitory computer-readable medium having instructions stored thereon, which, when executed by a processor in a server, cause the processor to perform operations comprising:
receiving, by the sever, a request from an entity wherein the request includes metadata specifying a plurality of non-responsive servers to which the entity sent the request but that could not process the request;
determining, by the sever, that the server is not a current home server for the entity based on information cached in the server, the information indicating that the current home server of the entity is one of the non-responsive servers to which the entity sent the request, wherein the current home server is a server within a plurality of preferred servers that processes requests for the entity and, in response thereto:
assigning, by the sever, the server as the current home server by updating the information cached in the server so that the entity will send subsequent requests to the server for processing; and
sending, by the sever, a response to the entity.

20. The non-transitory computer-readable medium of claim 19, further comprising processing the request to generate the response.

21. The non-transitory computer-readable medium of claim 19, further comprising:
receiving, by the sever, a second request from a second entity wherein the second request includes metadata specifying that the second entity has not sent the second request to a current home server for the second entity, wherein the current home server for the second entity is a server within a plurality of preferred servers that processes requests for the second entity;
determining, by the sever, that the server is not the current home server for the second entity based on information cached in the server and, in response thereto:
sending, by the sever, a redirect response to the second entity which will cause the second entity to send the second request to a server specified in the redirect response.

22. The non-transitory computer-readable medium of claim 19, further comprising:
receiving, by the sever, a second request from a second entity;
determining, by the sever, that the server is not a current home server for the second entity based on information cached in the server, wherein the current home server for the second entity is a server within a plurality of preferred servers that processes requests for the second entity;
determining, by the sever, that each of the preferred servers is one of the non-responsive servers; and
sending, by the sever, a second response wherein the response is a fail response which will cause the second entity to send the second request to another server of the plurality of preferred servers.

23. The non-transitory computer-readable medium of claim 19 wherein preferred servers are selected from a plurality of servers using a hash algorithm, a consistent-hash algorithm, or a uniform hash function.

24. The non-transitory computer-readable medium of claim 19, further comprising:
receiving, by the sever, a second request from a second entity;

determining, by the sever, that the server is a current home server for the second entity based on information cached in the server, wherein the current home server for the second entity is a server within a plurality of preferred servers that processes requests for the second entity and, in response thereto;

processing, by the sever, the second request to generate a second response; and sending, by the sever, the second response to the second entity.

25. The non-transitory computer-readable medium of claim 19, further comprising:

selecting, by the sever, a first server in the plurality of preferred servers that has lower resource usage than the server; and sending an offload request to the selected first server which will cause the first server to process the request.

26. The non-transitory computer-readable medium of claim 19, further comprising:

receiving, by the sever, an offload request from a first server, wherein the offload request indicates that the server has lower resource usage than the first server; and assigning, by the sever, the server as the current home server of a second entity based on the offload request so that the second entity will send subsequent requests to the server for processing.

27. The non-transitory computer-readable medium of claim 19, further comprising:

for one or more entities in a plurality of previously serviced entities, sending a gravitation request to a respective preferred server that is assigned to the entity, wherein the gravitation request will cause the respective preferred server to assign itself as the current home server of the entity so that the entity will send subsequent requests to the respective preferred server.

* * * * *